Nov. 12, 1968    H. P. VAYSON    3,410,442

TANK JOINT SEALS

Filed Oct. 15, 1965

Inventor

HENRI PAUL VAYSON

By Holcombe, Wetherill & Brisebois
Attorneys

United States Patent Office

3,410,442
Patented Nov. 12, 1968

3,410,442
TANK JOINT SEALS
Henri Paul Vayson, Paris, France, assignor to Societe Generale de Constructions Electriques, et Mecaniques (Alsthom), Belfort, France, a body corporate of France
Filed Oct. 15, 1965, Ser. No. 496,263
Claims priority, application France, Oct. 15, 1964, 2,556
5 Claims. (Cl. 220—9)

ABSTRACT OF THE DISCLOSURE

A sealed joint for a tank composed of laminated insulating material for containing a cryogenic substance comprises two wall portions of a laminated insulating material which are held together by synthetic resin adhesive along a ledge. The edge of the bonding surfaces is covered by a collar of glass cloth impregnated with synthetic resin and then polymerised in situ. One of the wall portions may be cylindrical and the other in plate form.

---

Figure 1:
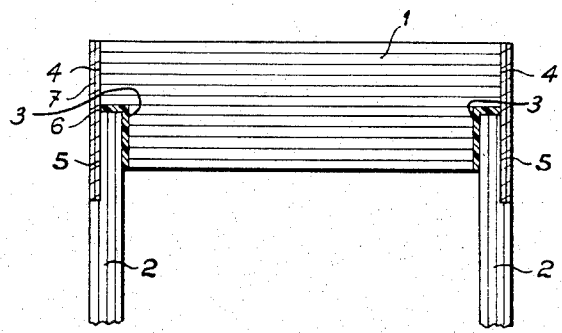

The production of tanks made of a laminated or layered insulating material, enclosing a cryogenic medium, constituted by a liquified gas, poses a problem of a seal for the joints. Tanks of this type may be used for producing electrical machines which have to operate in a cryogenic medium at temperatures lower than —200° C.

In order to confer the mechanical rigidity necessary for a large-size enclosure a laminated material may be called for, for example formed from glass cloth and epoxy or polyester resin. Such a material, of non-metallic nature, the thickness of which is suited to the dimensions of the part to be produced, has the advantage of being insulating and acts in a satisfactory manner both from the point of view of withstanding very cold conditions and to thermal shocks which it undergoes during the attainment of the operating temperature, and from the point of view of its impermeability with regard to cryogenic gases. In addition, this material offers the advantage of being relatively light, and of permitting an easy manufacture of the tank from cylinders or plates which are available in industry.

An advantageous construction for cryogenic enclosures made of a laminated material consists in assembling cylinders of such material, made by the known technique of rolling, at average pressure, and of plates machined from a flat material which may be manufactured by compression in a press at high pressures. The plates are used either for closing the ends to produce cylindrical tanks with flat bases, or to permit a concentric assembly of the cylinders in order to have closed annular spaces. As is known, laminated materials are non-isotropic materials whose mechanical characteristics are different in the direction of lamination as compared with the transverse direction of the fibres. The assembly between cylinders and plates thus necessarily produces, at the location of the joint, a contact between the faces machined along the two non-isotropic directions of the material.

Moreover, the art of thermal insulation of machines operating in a cryogenic medium consists in surrounding the compartment which encloses the liquified gases, by an insulating space within which a very high vacuum prevails. For a correct operation, the maintenance of a high vacuum in this space is necessary since any reduction of the vacuum is shown by an increase in the transmission of heat, thus by a decrease in the efficiency. A leakage of gas from the liquified gas enclosure towards this high vacuum space, through the joints, thus reduces the efficiency. It is also difficult to avoid this disadvantage as the gas utilised diffuses more easily. From among the cryogenic liquified gases, it is hydrogen which is most suitable for electrical machinery by reason of the high conductivity of aluminium at the temperature of —250° C. which is that at which hydrogen liquifies. In comparison with nitrogen or helium, it is also hydrogen which has the highest diffusion constant.

Adhesion between cylinder and plate, which are perfectly machined, by means of an adhesive of the same chemical nature as the resin used in the manufacture of the material, does not enable the difficulty of a perfect seal between the joints to be resolved, by reason of the inequalities of thermal expansions and contractions which are produced between materials assembled along non-isotropic surfaces. The stresses produced in the course of the successive cooling and heating cycles damage the seal of the joint.

The present invention has for an object an arrangement for sealing joints in tanks made of a laminated insulating material enclosing a cryogenic medium, which permits the diffusion of gas from the cryogenic medium to be avoided.

In brief, according to one characteristic of the invention, collars made of glass cloth impregnated by synthetic resin are applied to these joints. In fact, it has been ascertained that, contrary to what was anticipated this very simple arrangement obtained an excellent seal.

Figure 2:
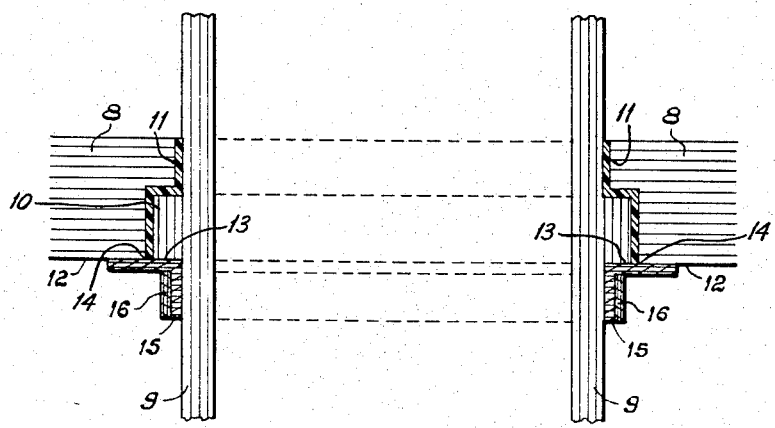

In order that the invention may be more clearly understood, reference will now be made to the accompanying drawings, given by way of example, of two embodiments thereof and in which:

FIGURE 1 shows a joint between a flat member such as a base and a cylinder for constituting a cylindrical tank made of laminated insulating material, and FIGURE 2 shows a cylinder made of a laminated insulating material passing through a plate of the same nature.

Referring to FIGURE 1, there is shown an end plate 1 obtained by compressing in a press a laminated material formed from glass cloth and epoxy resin. This end plate 1 is intended to be connected to a cylindrical wall 2, which is also made of glass cloth and epoxy resin, obtained by rolling or winding at an average pressure on a metal mandrel. The end plate 1 has been machined so as to present the external form of two superimposed discs, the diameters of which are respectively the internal diameter and the external diameter of the end of the cylindrical wall 2, for example 70 and 82 millimetres, and the total thickness of which is for example 24 millimetres.

The surfaces of the cylindrical wall 2 and the end plate 1 which must come into contact: internal cylindrical surface of the cylindrical wall 2 and cylindrical surface of the disc of small diameter of the end plate 1 on the one hand, flat annular surfaces of the end of the cylindrical wall 2 and of the disc of large diameter of the end plate 1, are rubbed with emery paper, whilst leaving between them a clearance smaller than 0.05 millimetre, whereafter they are coated with an adhesive made of epoxy resin, to form a layer 3 and they are assembled.

The joint between the end plate 1 and the cylindrical wall 2 thus obtained, covers the extreme flat face of the cylindrical wall 2, this avoiding risks of de-lamination, but this joint would be insufficient by itself for ensuring a seal against hydrogen, filling a cryogenic enclosure.

The shape given to the end plate 1 and the cylindrical wall 2 causes the external cylindrical surface 4 and 5, respectively of the end plate 1 and of the cylindrical wall 2, to be in line with one another, separated by the line of contact 6 formed by the contact surfaces. The desired seal is obtained with the aid of the addition of a collar 7 constituted by winding under tension on the surfaces 4 and 5, a strip of glass cloth which is progressively impregnated by a synthetic resin. When a sufficient thickness, 1.5 millimetres for example is obtained, it is bound and polymerised.

The size of the strip of glass cloth used is 10 to 30 millimetres according to the individual case, 30 millimetres in the example shown.

The impregnating resins are the same as those serving to adhere the cylinder 2 to the end plate 1. One of the following two formulae is preferably used:

*Formula I.*—Epon 828 resin of the Shell Company: 100 parts by weight. Agent Z of the said Shell Company (which is a polyamide adduct): 20 parts by weight.

*Formula II.*—Epon 828 resin: 100 parts by weight Versamide 125 of the General Mills Corporation: 66 parts by weight (which is a polyamide).

Formula I is used for small parts, and polymerisation is effected in a drier at 100° C. for 5 hours. Formula II is used for large parts, and polymerisation is effected at ambient temperature.

FIGURE 2 shows a plate 8 constituted like the end plate 1 of FIGURE 1, said plate 8 having an aperture in the form of two hollow superimposed discs. Passing through it is a cylindrical wall 9, of the same constitution as the cylindrical wall 2 of FIGURE 1, whose external diameter is equal to the smaller diameter of the aperture of the plate 8. This cylindrical wall 9 is provided with a shoulder 10, cylindrical in shape, whose diameter is equal to the larger diameter of the aperture of the plate 8 and whose height is equal to the height of the part having the larger diameter of this aperture.

To assemble the joint, the surfaces which are to be brought into contact, i.e., the cylindrical surface of the shoulder 10 and the cylindrical surface of the hollow disc of larger diameter of the aperture, flat annular surfaces of the shoulder 10 and the hollow disc of larger diameter of the aperture, portion of the external cylindrical surface of the wall 9 and cylindrical surface of the hollow disc of smaller diameter of the aperture, are adhered together by means of a layer 11 of epoxy resin.

Thus a flat surface 12 of the plate 8 and a flat surface 13 of the shoulder 10 are obtained in line with one another. Then these two faces 12 and 13 are covered on either side of the line of contact 13 by a collar 15 which has a shape of revolution of angular section and which may be obtained in the following manner. A piece of glass cloth is cut up into discs of an external diameter larger, e.g., 12 millimetres larger, than the external diameter, 82 millimetres for example, of the cylinder 9, pierced by a hole of diameter smaller than the external diameter of this cylinder 9, 10 millimetres for example. A certain number (about 6) of these discs are fitted together by impregnating them progressively with synthetic resin and by making radial notches on the periphery of the central hole of each disc in order to permit the latter to correspond in shape with the cylinder 9. The successive discs are placed with an angular misalignment with respect to one another, in order to render the collar 15 isotropic. The collar 15 is secured by means of a ring 16 formed by a strip of glass cloth, progressively impregnated by synthetic resin and wound under tension.

Polymerisation is effected in a drier or at ambient temperature, according to the dimension of the part, and the same formulae of resins are utilised as in the example of FIGURE 1.

The seal of the joints thus protected renders possible the use of tanks made of laminated material, in order to house an electrical installation therein operating in a cryogenic medium. In particular, and according to this process, it is possible to produce sealed joints between a thermally insulated enclosure under a vacuum of $10^{-5}$ millimetres of mercury and a medium of liquid hydrogen at $-250°$ C. ($23°$ K.).

Experiments have been made on joints thus produced from the point of view of their resistance to thermal shock in liquid hydrogen and of their seal against the diffusion of the hydrogen at cryogenic temperatures.

The experiments consisted in immersing in liquid hydrogen a cylinder made of a laminated material formed from glass cloth and epoxy resin, closed at the two ends by flat bases made of a laminated material, the joints of which had been produced and protected according to the preceding embodiments.

The tank thus constituted was filled with liquid hydrogen and placed in a first enclosure, under high vacuum, the degree of vacuum of which is measured continuosly, this first enclosure being surrounded by a second enclosure containing liquid nitrogen, defined by a thermally insulated wall. This nitrogen enclosure facilitates bringing to operational temperature.

Having produced a vacuum by pumping, the pressure rises again in time. The results of the experiments have shown the permanence of a vacuum of $5 \times 10^{-6}$ millimetres of mercury from an initial vacuum of $2 \times 10^{-6}$ millimetres of mercury after 36 hours of experiment, i.e., a leakage of $2.5 \times 10^{-8}$ millimetres per second, referred to normal conditions of temperature and pressure.

I claim:

1. A sealed joint for a tank composed of a laminated thermal insulating material for enclosing a cryogenic medium, comprising two wall portions made of a laminated thermal insulating material presenting bonding surfaces, one of said wall portions being cylindrical in shape and the other being in the form of a plate, and said bonding surfaces being surfaces of revolution, each said bonding surface being applied in opposed overlying relation to the bonding surface of the other wall portion, a layer of synthetic adhesive resin inserted between said bonding surfaces and securing said surfaces together, and a collar made of glass cloth impregnated by synthetic resin applied, on the side of said tank, against said wall portions so as to cover the edges of said bonding surfaces on said side of said tank.

2. A sealed joint according to claim 1, wherein said bonding surfaces have a shape such that, on at least one side of said tank, the edges of said bonding surfaces forming a line of contact between two surfaces of said wall portions which are situated in alignment with one another.

3. A sealed joint according to claim 1, wherein one said wall portion is cylindrical and the other said wall portion is an end plate in the form of two superimposed discs one of which is of smaller diameter than the other, and said diameters being respectively equal to the internal and external diameters of one end of said cylindrical wall, the said cylindrical wall being applied against said endplate along bonding surfaces constituted by the internal cylindrical surface of said end of the cylindrical wall and the cylindrical surface of said disc of small diameter, on the one hand, the flat annular surface of said end of the cylindrical wall and the flat annular surface appearing on said disc of larger diameter on the other hand, a layer of synthetic adhesive resin between said bonding surfaces, and a cylindrical collar made of glass cloth impregnated by a synthetic resin, applied against the external cylindrical surface of said end of the cylindrical wall and the cylindrical surface of said disc of larger diameter, to cover the edge of the bonding surfaces constituted by the flat annular surfaces of said end of the cylindrical wall and said disc of larger diameter.

4. A sealed joint according to claim 1, wherein one said wall portion is an external cylindrical shoulder on said cylindrical wall, presenting a cylindrical surface, a first flat annular surface and a second flat annular surface, and said other wall portion is an apertured plate wherein the aperture is defined adjacent one face of the plate by a cylindrical surface of substantially the same diameter as the external diameter of the cylindrical wall and is defined adjacent the other surface of the plate by a cylindrical surface of substantially the same diameter as the external diameter of the cylindrical shoulder on the said cylindrical wall, said cylindrical surfaces of the aperture being concentric and having both of their inner ends in the same plane and joined by a flat annular surface, said cylindrical wall being applied against said plate along bonding surfaces constituted firstly by said cylindrical surface of said shoulder and by the cylindrical surface of said aperture which is of substantially the same diameter as the cylindrical surface of said shoulder, secondly by said first flat annular surface of said shoulder and by the flat annular surface joining the cylindrical surfaces of the aperture of the plate, thirdly by the portion of the external cylindrical surface of said cylindrical wall, adjacent said first flat annular surface of said shoulder and of height equal to that of the other cylindrical surface of the plate aperture, a layer of synthetic adhesive resin between said bonding surfaces, a collar made of glass cloth impregnated by a synthetic resin, in the form of an apertured disc, divided into two concentric parts, the parts having the larger diameter of which is applied against said second flat annular surface of the shoulder and the flat surface of said plate adjacent this second annular surface, and the part having the smaller diameter of which is folded back at right angles along the external cylindrical surface of said wall adjacent said second flat annular surface of said shoulder, and a cylindrical ring made of glass cloth, impregnated by synthetic resin, applied to said part having the smaller diameter of said collar.

5. A method of sealing a joint between two parts of laminated thermal insulating material of a container for a cryogenic substance comprising the steps of forming a ledge in at least one of said parts, assembling said two parts into abutment on said ledge by coating the contact surfaces with synthetic resin adhesive and applying a collar of glass cloth impregnated with synthetic resin so as to cover the edge of said contact surfaces and polymerising said resin.

References Cited

UNITED STATES PATENTS

| | | | |
|---|---|---|---|
| 2,350,271 | 5/1944 | Braloff | 229—4.5 |
| 3,003,810 | 10/1961 | Kloote et al. | 220—9 |
| 3,073,475 | 1/1963 | Fingerhut | 220—3 |
| 3,079,026 | 2/1963 | Dosker | 220—9 |
| 3,106,313 | 10/1963 | Kurham | 220—9 |
| 3,155,260 | 11/1964 | Widener | 220—9 |
| 3,296,802 | 1/1967 | Williams | 229—4.5 |

THERON E. CONDON, *Primary Examiner.*

J. R. GARRETT, *Assistant Examiner.*